(12) United States Patent
Lortz

(10) Patent No.: US 6,745,026 B2
(45) Date of Patent: *Jun. 1, 2004

(54) PERSONAL COMPUTER-BASED PAGING SYSTEM

(75) Inventor: Victor B. Lortz, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,056

(22) Filed: Dec. 14, 1998

(65) Prior Publication Data

US 2001/0049280 A1 Dec. 6, 2001

(51) Int. Cl.$^7$ ................................................ H04M 3/00
(52) U.S. Cl. .................................. 455/420; 379/142.15
(58) Field of Search ................................. 455/419, 420, 455/458, 38.2, 426, 427, 466; 340/825.44, 7.43, 7.54; 711/206; 708/109; 709/100; 379/142.03, 142.04, 142.07, 142.1, 142.12, 142.13, 142.15

(56) References Cited

U.S. PATENT DOCUMENTS

| | | | | |
|---|---|---|---|---|
| 4,845,491 A | * | 7/1989 | Fascenda et al. | 340/7.47 |
| 4,985,895 A | * | 1/1991 | Pelkey | 714/758 |
| 5,337,044 A | * | 8/1994 | Folger et al. | 340/7.1 |
| 5,455,572 A | * | 10/1995 | Cannon et al. | 340/7.54 |
| 5,544,036 A | * | 8/1996 | Brown et al. | 340/825.24 |
| 5,608,655 A | * | 3/1997 | Moughanni et al. | 340/7.1 |
| 5,611,055 A | * | 3/1997 | Krishan et al. | 340/7.4 |
| 5,661,468 A | * | 8/1997 | Marcoux | 340/7.1 |
| 5,671,267 A | * | 9/1997 | August et al. | |
| 5,802,467 A | * | 9/1998 | Salazar et al. | |
| 5,923,269 A | * | 7/1999 | Shuey et al. | 340/870.02 |
| 5,963,624 A | * | 10/1999 | Pope | 455/420 |
| 6,069,896 A | * | 5/2000 | Borgstahl et al. | 370/401 |
| 6,134,608 A | * | 10/2000 | Jacober et al. | 710/40 |
| 6,163,274 A | * | 12/2000 | Lindgren | 340/7.29 |
| 6,215,980 B1 | * | 4/2001 | Kim | 455/91 |
| 6,252,883 B1 | * | 6/2001 | Schweickart et al. | 370/441 |
| 6,282,183 B1 | * | 8/2001 | Harris et al. | 370/230 |
| 6,438,585 B2 | * | 8/2002 | Mousseau et al. | 709/206 |

* cited by examiner

*Primary Examiner*—Curtis Kuntz
*Assistant Examiner*—Barry W Taylor
(74) *Attorney, Agent, or Firm*—Schwegman, Lundberg, Woessner & Kluth, P.A.

(57) ABSTRACT

A paging system uses a stationary personal computer to receive paging signals. The personal computer executes an instruction set, or software, which allows the personal computer to forward or process received page signals. By using a stationary personal computer, received page signals can be used to control the personal computer to contact external devices such as: other personal computers, telephones, fax machines, Internet locations, pagers, and household devices. The personal computer can store received page signals including origination identification information. A multiplex forwarding system can be used by providing identification header information.

30 Claims, 2 Drawing Sheets

PERSONAL COMPUTER-BASED PAGING SYSTEM

TECHNICAL FIELD OF THE INVENTION

The present invention relates generally to personal computers and in particular the present invention relates to a paging system using a stationary personal computer.

BACKGROUND OF THE INVENTION

Modern communications systems allow individuals to receive and communicate information virtually anywhere on the planet. Communication devices such as cellular telephones and pagers, for example, allow individuals to be contacted and communicated with from most geographic locations. Paging devices, as known to those skilled in the art, receive wireless communications intended to provide information to a user. That is, paging signals traditionally include a telephone number which the page recipient is requested to call. More advanced paging signals include alphanumeric messages which provide more detailed instructions to the receiver. Further, two-way paging systems are available wherein the receiving user has an opportunity to provide a response to the received page. Typically, a pager is portable and constructed to have a pocket sized package.

With the continued advancement of portable computers, page receiving circuitry can be provided to allow the portable computer to receive wireless paging signals and notify a user of the computer. This system allows the user to receive page communications without carrying two devices, the portable computer and a paging device. The present systems are based on a premise that a location of a recipient of a page is unknown. Thus, flexibility is provided to allow the receiving unit mobility.

For the reasons stated above, and for other reasons stated below which will become apparent to those skilled in the art upon reading and understanding the present specification, there is a need in the art for a more flexible communication system.

SUMMARY OF THE INVENTION

The above mentioned problems with communication systems and other problems are addressed by the present invention and will be understood by reading and studying the following specification.

In one embodiment, the present invention describes a system for processing wireless paging signals comprising a stationary computer comprising a processor, a receiver circuit for receiving and decoding the wireless paging signals, and a memory for storing paging instructions for processing the received paging signals. The processor executes the paging instructions to forward the received paging signals to an external device.

In another embodiment, a method of processing wireless paging signals is described. The method comprises receiving a page signal with a stationary base computer, and decoding the page signal, wherein the page signal comprises data. The data is forwarded to an external receiving device in response to instructions executed by the stationary base computer.

In yet another embodiment, a method is described for controlling a base processor comprising a page signal receiver, an instruction set, and an output communication device. The method comprises receiving a page signal with the page signal receiver. The page signal comprises instruction data. The base processor executes the instruction set in response to the received page signal instruction data.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 1:
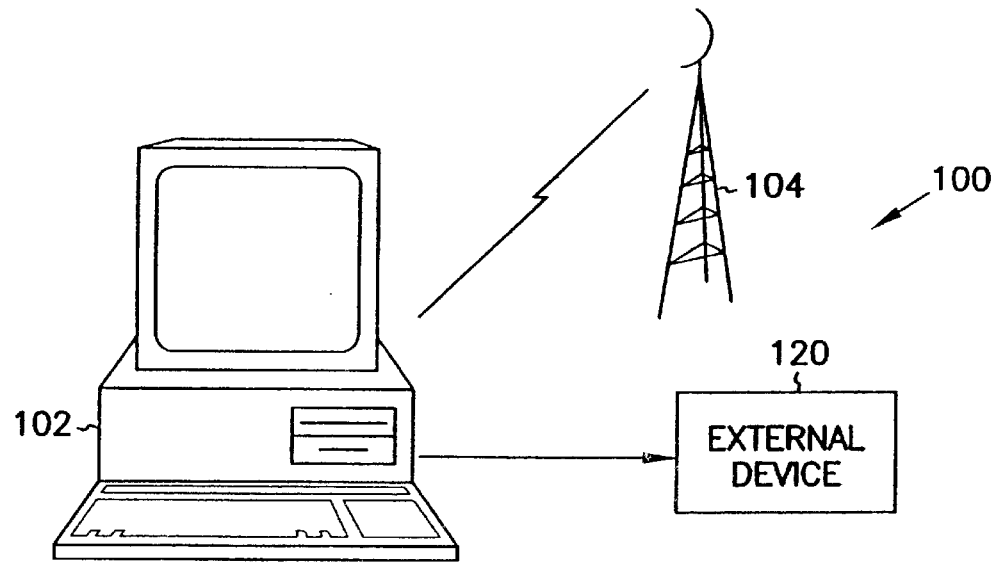
FIG. 1 illustrates a page communication system of the present invention.

Referring to FIG. 1, a page communication system 100 of the present invention is described. The system includes a home based stationary computer 102, or personal computer (PC), and a page transmitter 104. The computer 102 can also be referred to as a base processor. The term stationary is used herein to differentiate between a portable, or lap-top type computer and a computer which is not typically mobile. Thus, a home or office based computer is considered stationary, even though it is capable of being moved. The page transmitter is configured to transmit wireless communications signals. The transmitter can use any known radio communication configuration. In operation, a source contacts the page transmitter and provides page data. The transmitter transmits the page data over a relatively large geographic area such that page receivers located in the geographic area can receive transmissions directed to it. As described above, pagers have traditionally been mobile. The present invention, however, uses a home based personal computer 102 to receive page data transmitted by the transmitter. The personal computer can be any type of personal computer commercially available, but includes software which directs the computer to process the page data according to a predefined instruction set.

Figure 2:
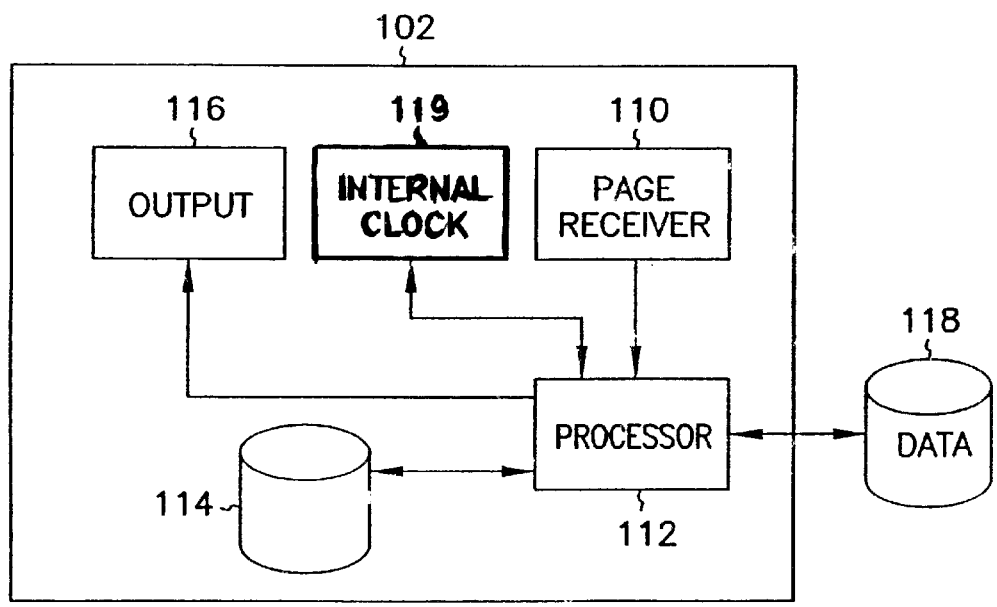
FIG. 2 is a block diagram of a processor of the system of FIG. 1.

FIG. 2 illustrates one embodiment of a processor, or personal computer, included in the system of FIG. 1. The personal computer includes a page receiving circuit 110 for receiving wireless page signals, a processor 112, a memory 114 for storing at least received page signals, and an output device 116. The output device 116 can be a modem for contacting an external device 120 via a telephone line, communication bus, or the like. The external device 120 can be a memory or hard drive located in the computer, but external to the processor. Further, the output device 116 can be a driver circuit for providing an output signal to an external device, such as a transducer which controls a light or home appliance, as explained below. It will be appreciated that the personal computer of FIG. 2 has been simplified to describe the present invention, and can include numerous features not described herein.

Figure 3:
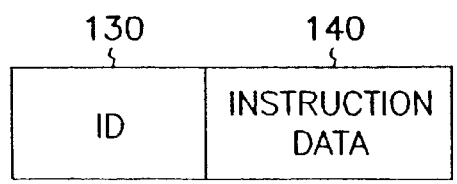
FIG. 3 illustrates one embodiment of page data.

One embodiment of page data which can be received by the personal computer, is illustrated in FIG. 3. The page data includes an identification header 130 used by the personal computer to process the page. The page data also includes instruction data 140 used by the personal computer. The identification header, for example, can indicate a number from 0 to 9. Each number indicates either a different desired process to be executed by the personal computer, or external device location to be contacted by the personal computer. In one embodiment, an identification header of 1 indicates to the personal computer that an external computer network such as the Internet is to be contacted. In this embodiment, the instruction data provided in the page includes an address of the computer network which is to be contacted. Numerous different instructions can be performed by the personal computer to process received page signals. It will be appreciated by those skilled in the art after studying the present description, that a stationary personal computer which is connected to a telephone type wiring system provides numerous ways to process a paging signal which is not possible using either a pager or a mobile personal computer. The following paragraphs describe in more detail some of the numerous ways in which the present invention can process paging signals.

Figure 4:
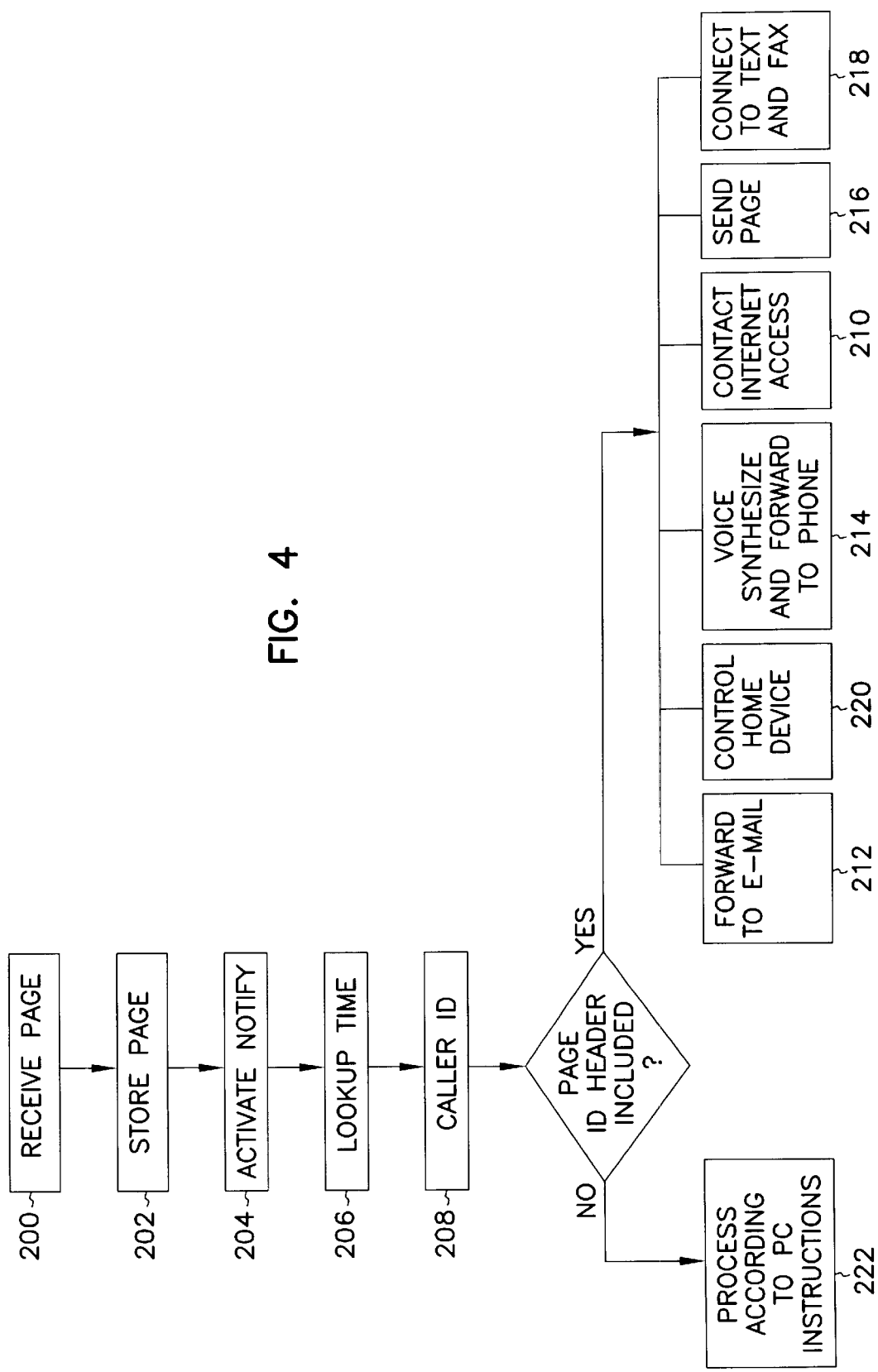
FIG. 4 illustrates different operating instructions executable by the processor of FIG. 2.

FIG. 4 illustrates a representative flow chart of possible operating options available using the personal computer. The first step in operation is to receive a page signal 200. As described above, the processor operates in response to an instruction set, or software. As such, the personal computer can be configured to perform one or more operations using the received page signal. As illustrated, the personal computer can store the page information 202 including a time of day when the page was received. The personal computer can activate a notify operation 204 to inform a person in the house that a page has been received. It is contemplated that this notify operation includes activating either a visual indication, such as a light, or an audio indication such as a speaker or horn. Further, the personal computer can be configured to decode the received page to determine a correct time of day 206, and update an internal clock 119 of the personal computer. Also a caller identification type operation 208 can be performed on the received page to identify where the page originated. This identification can be performed by either accessing any internal database provided in personal computer memory 114, or accessing an external database 118 (FIG. 2) via a computer network to determine the page origination identification.

In another embodiment, the personal computer is instructed to contact an external computer network 210, such as the Internet, in response to a page. As such, the page identification header indicates to the personal computer that an Internet connection is desired and the personal computer contacts an Internet location as either predefined, or contained within the page information. This embodiment allows the personal computer to rendezvous with another personal computer on the Internet. For example, a user can send an alpha numeric page containing the message: "Internet Connect AppID 134.134.67.890" where the application identifier and IP address of the caller is contained in the message. The home-based personal computer, which might have previously been in a low-power state, is awakened by the page, connects to the Internet, and launches a specified application with a parameter specifying the IP address to connect to.

Using the identification header described above, a multiplex paging service to an entire household can be achieved. The identification header provides a simple convention for encoding the intended recipient. For example, each member of a household can be assigned a single digit code number which is provided in the identification header. For example, Mom can be assigned a digit code of 1 and Dad can be assigned a digit code of 2. A caller, therefore, wishing to page Mom with the phone number 123-4567 would provide a page signal comprising the digits 01-123-4567. The personal computer would interpret the identification header 01 to mean user number 1 (Mom) and forward the rest of the number (123-4567) according to whatever instruction set has been established for that user. For example personal computer might forward the number as electronic mail corresponding to Mom at work, or the personal computer could call another page number 216 corresponding to a portable pager carried by Mom, or the PC could fax 218 the data to Mom.

If the page data received by the personal computer includes an identification header, the personal computer can process the received page in numerous different manners. For example, as illustrated in FIG. 4, the personal computer can be instructed to forward the received page data to an electronic mail address which is defined by the identification header. That is, the personal computer database has a table of electronic mail addresses stored therein and identified by a code letter or number. The received page identification header indicates a desired code letter or number such that the personal computers can retrieve the electronic mail address from its database. Likewise, the identification header can indicate that an electronic mail forwarding process is desired, and the electronic mail address can be provided in the description data of the received page. Likewise, the identification header can be used by the processor to control a home device 220. That is, the personal computer can execute instructions in response to the identification header such that a home device can be activated, such as, but not limited to, a television video recorder.

If the personal computer includes the human voice synthesizer, the personal computer can contact an external telephone 214 and deliver a message indicating that a page was received, and/or a content of the page signal. Again, the external telephone number can be stored in the internal database or contained within the page data itself. The personal computer, likewise, can execute a page to another address and provided data thereto. This data can indicate to an external page receiving unit that a page was received and/or include the information from the original page signal. In yet another embodiment, the computer can be instructed via its software to send a facsimile to either a predetermined location, or a location defined in the received page signals. Thus, the personal computer can be used as a base station to receive page signals on a single page address and process the page to provide flexibility in processing received data.

The instruction set executed by the personal computer can be configured such that if a received page signal does not include an identification header, the personal computer will execute a predetermined operation 222. For example, a user can configure the personal computers to forward all received page signals to a predefined electronic mail address, forward to a predefined telephone number, send a page to a predefined address, send a facsimile to a predefined location, or any other type of forwarding process. Likewise, the personal computer can be configured to merely receive page signals and maintain a log of all received page signals. This log can include more information than presently available, for example the personal computer can identify an origination location of the page and include both the received time and a time zone of the origination location. This feature allows a user to determine the present time at the origination location when the data is later retrieved.

A paging system has been described which uses a stationary personal computer to receive paging signals. The personal computer executes an instruction set, or software, which allows the personal computer to forward or process received page signals. By using a stationary personal computer, received page signals can be used to control the personal computer to contact external devices such as, but not limited to: other personal computers, telephones, fax machines, Internet locations, pagers, and household devices. The personal computer can store received page signals including origination identification information. A multiplex forwarding system can be used by providing identification header information.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the personal computer can be configured to recognize the same incoming page signals as a hand-held pager. The personal computer could then maintain a master record of received pages. This is particularly useful when the hand held pager is located in a geographic location which prohibits accurate receipt of paging signals. Thus, the hand-held paging device can be synchronized with the personal computer periodically such that any missed messages are detected by the personal computer and brought to the user's attention. Therefore, it is manifestly intended that this invention be limited only by the claims and the equivalents thereof.

What is claimed is:

1. A method comprising:
   receiving in a stationary personal computer a wireless page signal transmitted by a remote base station over a wide geographic area;
   if the page signal does not contain an identification header, executing a user-configurable instruction set stored in the personal computer;
   if the page signal does contain an information header, detecting one of a plurality of codes in the header;
   if the header contains a first of the codes, controlling an external device according to instructions stored in the personal computer;
   if the header contains a second of the codes, contacting one of a plurality of external locations specified by the page, the one external location being taken from the group consisting of an external computer network, an electronic mail address, a telephone number, a portable pager number, and a fax machine number.

2. The method of claim 1 wherein the external device is a light or a home appliance.

3. The method of claim 2 wherein the home appliance is a video recorder.

4. The method of claim 1 wherein contacting comprises forwarding information with respect to the page to one of a number of different recipients specified in the identification header.

5. The method of claim 4 wherein different ones of the codes in the header identify the different recipients.

6. The method of claim 4 wherein forwarding comprises forwarding information contained within the page.

7. The method of claim 4 wherein forwarding to one of the recipients is carried out according to an instruction set established by the one recipient.

8. A medium readable by a computer and containing instructions for causing the computer to carry out the method of claim 1.

9. A method comprising:
   receiving in a stationary personal computer a wireless page signal transmitted by a remote base station over a wide geographic area;
   if the page signal does not contain an identification header, executing a user-configurable instruction set stored in the personal computer;
   if the page signal does contain an information header, detecting one of a plurality of codes in the header;
   if the header contains a first of the codes, controlling an external device according to instructions stored in the personal computer;
   if the header contains a second of the codes, contacting one of a plurality of external locations specified by the page, the one external location being taken from the group consisting of an external computer network, an electronic mail address, a telephone number, a portable pager number, and a fax machine number, the header of the page indicates a type of external location.

10. The method of claim 9 wherein a data portion separate from the header contains the location information.

11. The method of claim 10 wherein the data portion contains an Internet location.

12. The method of claim 10 wherein the data portion contains an electronic mail address.

13. The method of claim 9 wherein the location is predefined.

14. The method of claim 13 the location is an Internet location.

15. The method of claim 13 wherein the location is an electronic mail address stored in a table.

16. A medium readable by a computer and containing instructions for causing the computer to carry out the method of claim 9.

17. A system comprising a stationary computer including:
   a receiver to receive a wireless page signal transmitted over a wide geographic area by a remote base station;
   a driver circuit to provide an output to an external device;
   a memory for holding data and instruction sets;
   a processor coupled to the receiver, driver circuit, and memory;
   software executing on the processor to
      determine whether or not the page signal contains an identification header,
      execute a user-configurable one of the instruction sets from the memory if the page signal does not contain a header;
      detect one of a plurality of codes in the header if the page signal contains a header;
      provide an output to the driver circuit to control the external device according to one of the instruction sets in the memory if the header contains a first of the codes;
      contact an external location specified by the page if the header contains a second of the codes, the one external location being taken from the group consisting of an external computer network, an electronic mail address, a telephone number, a portable pager number, and a fax machine number.

18. The system of claim 17 wherein the computer is a personal computer.

19. The system of claim 18 wherein the computer is a home-based personal computer.

20. The system of claim 17 wherein the computer further includes a hard drive located in the computer.

21. The system of claim 17 further comprising a database.

22. The system of claim 21 wherein the database is external.

23. The system of claim 21 wherein the processor is configured to access the database to determine an origin of the page.

24. The system of claim 17 further comprising a log of received page signals.

25. The system of claim 24 wherein the log includes an origination location of the page.

26. The system of claim 24 wherein the computer further includes a clock.

27. The system of claim 26 wherein the computer is configured to include a received time and a time zone of an origin location of the page.

28. The system of claim 17 further comprising a home appliance controlled by the output.

29. The system of claim 17 wherein the page signal also includes a data portion if it includes the identification header.

30. The system of claim 29 wherein the data portion specifies the external location.

* * * * *

UNITED STATES PATENT AND TRADEMARK OFFICE
CERTIFICATE OF CORRECTION

PATENT NO. : 6,745,026 B2 Page 1 of 1
APPLICATION NO. : 09/211056
DATED : June 1, 2004
INVENTOR(S) : Lortz It is certified that error appears in the above-identified patent and that said Letters Patent is hereby corrected as shown below:

On the Title page, in item (56), under "U.S. Patent Documents", in column 2, line 7, after "August et al." insert -- 379/102.03 --, therefor.

On the Title page, in item (56), under "U.S. Patent Documents", in column 2, line 8, after "Salazar et al." insert -- 340/825.72 --, therefor.

column 6, line 19, in Claim 9, insert -- wherein -- before "the".

Signed and Sealed this

Twenty-fourth Day of October, 2006

JON W. DUDAS
*Director of the United States Patent and Trademark Office*